(12) United States Patent
Ito et al.

(10) Patent No.: US 9,816,638 B2
(45) Date of Patent: Nov. 14, 2017

(54) VALVE ATTACHMENT STRUCTURE AND FLUID APPARATUS TO WHICH VALVE IS ATTACHED

(71) Applicants: Satake Corporation, Tokyo (JP); Mechano Transformer Corporation, Tokyo (JP)

(72) Inventors: Takafumi Ito, Hiroshima (JP); Yoichi Kawamura, Hiroshima (JP); Tadashi Matsushita, Hiroshima (JP); Sze Keat Chee, Tokyo (JP); Toshitada Hirata, Chiba (JP); Yoshinori Kawawa, Chiba (JP)

(73) Assignees: SATAKE CORPORATION, Tokyo (JP); MECHANO TRANSFORMER CORPORATION, Tokyo (JP)

( * ) Notice: Subject to any disclaimer, the term of this patent is extended or adjusted under 35 U.S.C. 154(b) by 0 days.

(21) Appl. No.: 15/112,544

(22) PCT Filed: Nov. 17, 2014

(86) PCT No.: PCT/JP2014/080369
§ 371 (c)(1),
(2) Date: Jul. 19, 2016

(87) PCT Pub. No.: WO2015/107768
PCT Pub. Date: Jul. 23, 2015

(65) Prior Publication Data
US 2016/0334028 A1 Nov. 17, 2016

(30) Foreign Application Priority Data

Jan. 20, 2014 (JP) .................................. 2014-008053

(51) Int. Cl.
*F16K 27/12* (2006.01)
*F16K 31/00* (2006.01)
*F16K 27/00* (2006.01)

(52) U.S. Cl.
CPC .............. *F16K 27/12* (2013.01); *F16K 27/00* (2013.01); *F16K 27/003* (2013.01); *F16K 31/004* (2013.01)

(58) Field of Classification Search
CPC ....... F16K 27/12; F16K 27/003; F16K 31/004
See application file for complete search history.

(56) References Cited

U.S. PATENT DOCUMENTS

| 8,066,028 B2* | 11/2011 | Kees ................... F15B 13/0814 |
| | | 137/315.09 |
| 8,191,576 B2* | 6/2012 | Himmelmann ....... F16K 27/003 |
| | | 137/614.02 |

(Continued)

FOREIGN PATENT DOCUMENTS

JP 03027786 U1 3/1991
JP H04272583 A 9/1992

(Continued)

OTHER PUBLICATIONS

International Search Report for Application No. PCT/JP2014/080369 dated Feb. 3, 2015.

*Primary Examiner* — Kevin Lee
(74) *Attorney, Agent, or Firm* — Orion Consulting, Ltd.; Joseph P. Farrar, Esq.

(57) ABSTRACT

A protruding section formed at the one side end of a connector section provided in a valve is inserted into a recessed section formed as part of a valve placement section of a fluid apparatus. The valve is caused to pivot with the inserted portion that serves as a supporting point, and an engaging section formed at the front end of a lever of a hook section formed at the other side end of the connector section (Continued)

is allowed to engage with an engaging protruding section formed as part of the valve placement section of the fluid apparatus. The valve is thus attached to the fluid apparatus.

6 Claims, 9 Drawing Sheets

(56) References Cited

U.S. PATENT DOCUMENTS

| 9,097,359 B2* | 8/2015 | Ito .......................... B07C 5/3425 |
| 2009/0242040 A1 | 10/2009 | Kees |

FOREIGN PATENT DOCUMENTS

| JP | 2970823 B2 | 11/1999 |
| JP | 2004526919 A | 9/2004 |
| JP | 2012035185 A | 2/2012 |
| JP | 2013124695 A | 6/2013 |
| JP | 2013241977 A | 12/2013 |

* cited by examiner

VALVE ATTACHMENT STRUCTURE AND FLUID APPARATUS TO WHICH VALVE IS ATTACHED

CROSS REFERENCE TO RELATED APPLICATIONS

The present application is a national phase entry under 35 U.S.C. §371 of International Application No. PCT/JP2014/080369, filed Nov. 17, 2014, which claims priority from JP Patent Application No. 2014-008053, filed Jan. 20, 2014, the entire disclosures of which are hereby incorporated by reference herein.

TECHNICAL FIELD

The present invention relates to a valve attachment structure, and particularly to a structure for attaching a valve, such as a piezoelectric valve and an electromagnetic valve, to a fluid apparatus, such as a manifold.

BACKGROUND ART

A fluid apparatus to which a large number of valves are connected has been known in related art (see Patent Literatures 1 to 4).

Patent Literatures 1 to 3 each describe that a manifold to which a large number of electromagnetic valves are connected is used to form an ejector of an optical particulate sorter.

Patent Literature 4 describes that a manifold to which a large number of piezoelectric valves are connected is used to form an ejector of an optical particulate sorter.

Each of the ejectors described above has a large number of nozzle holes open through the front end of the ejector, and air is ejected through the nozzle holes when the valves operate.

Each of the optical particulate sorters described above blows predetermined particulates off with the aid of the effect of the ejector to sort the particulates.

In each of the ejectors described above, when any of the valves malfunctions, the valve needs to be replaced.

In relation to the exchange of a valve, Patent Literature 1 describes a structure in which a valve is attached to the manifold by using threaded members.

The valve attachment structure using threaded members, however, undesirably requires time to replace a valve.

Patent Literature 2 illustrates a structure in which a valve is attached to the manifold by using clips. According to the valve attachment structure, a valve can be readily replaced, as compared with the attachment structure using threaded members.

The valve attachment structure using clips described above, however, requires an operator to operate the clips by exertion of force with two fingertips. Therefore, when a large number of valves are replaced, the replacement cannot always undesirably be performed quickly.

CITATION LIST

Patent Literature

Patent Literature 1
   Japanese Patent Laid-Open No. 2013-241977
Patent Literature 2
   Japanese Patent Laid-Open No. 2012-35185
Patent Literature 3
   Japanese Patent No. 2970823
Patent Literature 4
   Japanese Patent Laid-Open No. 2013-124695

SUMMARY OF INVENTION

Technical Problem

An object of the present invention is to provide a valve attachment structure that allows a valve to be quickly attached to and detached from a fluid apparatus, such as a manifold, and further provide a fluid apparatus to which the valve is attached.

Solution to Problem

To achieve the object described above, the present invention relates to:

a valve attachment structure for attaching a valve to a fluid apparatus, the valve having a gas suction path that communicates with a gas supply passage of the fluid apparatus and a gas discharge path that communicates with a discharge passage of the fluid apparatus, compressed air sucked via the gas supply passage of the fluid apparatus through the gas suction path into the valve being discharged by the valve in operation through the gas discharge path via the discharge passage of the fluid apparatus, the valve attachment structure being characterized in that:

the valve is provided with a connector section having a contact surface which is located on a fluid apparatus attachment side of the valve that is a side to which the fluid apparatus is attached, through which a suction port of the gas suction path and a discharge port of the gas discharge path open, and which comes into contact with the fluid apparatus, the connector section has a protruding section formed on one side end thereof and a hook section formed on another side end thereof, the hook section has an engaging section formed on a front end thereof and has a lever having a rear end side that serves as a pressing section, the lever, specifically, a portion thereof in an intermediate position between the engaging section and the pressing section is linked with the other end of the connector section via a hinge section in an elastically deformable manner, and the protruding section formed at the one side end of the connector section is inserted into a recessed section formed as part of a valve placement section of the fluid apparatus, the valve is caused to pivot with the inserted portion that serves as a supporting point, and the engaging section formed at the front end of the lever of the hook section formed at the other side end of the connector section is allowed to engage with an engaging protruding section formed as part of the valve placement section of the fluid apparatus, so that the valve is attached to the fluid apparatus.

A protruding strip may be formed on the contact surface of the connector section and on the one side of the connection section, the protruding strip extending from the one side toward the other side, a suction protruding section through which the suction port of the gas suction path opens being formed on the other side of the connector section, and the protruding strip formed on the one side of the connector section may be fit into a recessed strip formed as part of the valve placement section of the fluid apparatus, and the suction protruding section formed on the other side of the connector section may be fit into a gas supply recessed section which is formed as part of the valve placement section of the fluid apparatus and through which the gas supply passage opens, so that the valve is positioned with respect to the fluid apparatus.

The recessed section and the engaging protruding section may be so formed, as part of the valve placement section of the fluid apparatus, as to continuously extend, and a large number of valves may be connected to the fluid apparatus by use of the recessed section and the engaging protruding section.

The valve may include a valve main body that sucks compressed air through the gas suction path, the valve may be a piezoelectric valve in which a valve body that opens and closes the gas discharge path, a piezoelectric element that produces drive force in the form of displacement necessary to actuate the valve body, and an actuator having a displacement magnifying mechanism that magnifies the displacement of the piezoelectric element and applies the magnified displacement to the valve body are disposed in the valve main body, a wiring substrate for feeding electricity to the piezoelectric element may be disposed between the valve main body and the connector section, and a wiring connector for feeding electricity to the piezoelectric element via the wiring substrate may be disposed on the one side of the connector section and in a position facing a side surface of the valve main body.

The present invention further relates to a fluid apparatus to which a valve is attached with the aid of any of the attachment structures described above.

The present invention further relates to an ejector of an optical particulate sorter, the ejector formed of a manifold which is the fluid apparatus described above and to which a large number of valves are connected.

Advantageous Effects of Invention

A valve is provided with a connector section having a contact surface which is located on a fluid apparatus attachment side of the valve that is the side to which a fluid apparatus is attached, through which a suction port of a gas suction path and a discharge port of a gas discharge path open, and which comes into contact with the fluid apparatus. A connector section has a protruding section formed on one side end thereof and a hook section formed on the other side end thereof, the hook section has an engaging section formed on the front end thereof and has a lever having a rear end side that serves as a pressing section, and the lever, specifically, a portion thereof in an intermediate position between the engaging section and the pressing section is linked with the other end of the connector section via a hinge section in an elastically deformable manner. The protruding section formed at the one side end of the connector section is inserted into a recessed section formed as part of a valve placement section of the fluid apparatus, the valve is caused to pivot with the inserted portion that serves as a supporting point, and the engaging section formed at the front end of the lever of the hook section formed at the other side end of the connector section is allowed to engage with an engaging protruding section formed as part of the valve placement section of the fluid apparatus, so that the valve is attached to the fluid apparatus. The valve can therefore be readily and quickly attached to and detached from the fluid apparatus, such as a manifold, in one-touch operation.

A protruding strip is formed on the contact surface of the connector section and on the one side of the connection section, the protruding strip extending from the one side toward the other side, and a suction protruding section through which the suction port of the gas suction path opens is formed on the other side of the connector section. To attach the valve to the fluid apparatus, the protruding strip formed on the one side of the connector section is fit into a recessed strip formed as part of the valve placement section of the fluid apparatus, and the suction protruding section formed on the other side of the connector section is fit into a gas supply recessed section which is formed as part of the valve placement section of the fluid apparatus and through which the gas supply passage opens, so that the valve can be readily and precisely positioned with respect to the fluid apparatus.

The recessed section and the engaging protruding section are so formed, as part of the valve placement section of the fluid apparatus, as to continuously extend, and the valve is attached to the fluid apparatus by use of the recessed section and the engaging protruding section formed as part of the valve placement section, so that a large number of valves can be readily and quickly connected to the fluid apparatus.

The valve is a piezoelectric valve which includes a valve main body that sucks compressed air through the gas suction path and in which a valve body that opens and closes the gas discharge path, a piezoelectric element that produces drive force in the form of displacement necessary to actuate the valve body, and an actuator having a displacement magnifying mechanism that magnifies the displacement of the piezoelectric element and applies the magnified displacement to the valve body are disposed in the valve main body, a wiring substrate for feeding electricity to the piezoelectric element is disposed between the valve main body and the connector section, and a wiring connector for feeding electricity to the piezoelectric element via the wiring substrate is disposed on the one side of the connector section and in a position facing a side surface of the valve main body, so that the wiring connector does not obstruct the attachment and detachment of the valve to and from the fluid apparatus.

A fluid apparatus to which a valve is attached with the aid of the attachment structure described above allows the valve to be readily and quickly attached to and detached from the fluid apparatus in one-touch operation.

An ejector of an optical particulate sorter, the ejector formed of a manifold to which a large number of valves are connected by use of the attachment structure described above allows the valves to be readily and quickly attached to and detached from the manifold in one-touch operation.

DESCRIPTION OF EMBODIMENT

Figure 1:
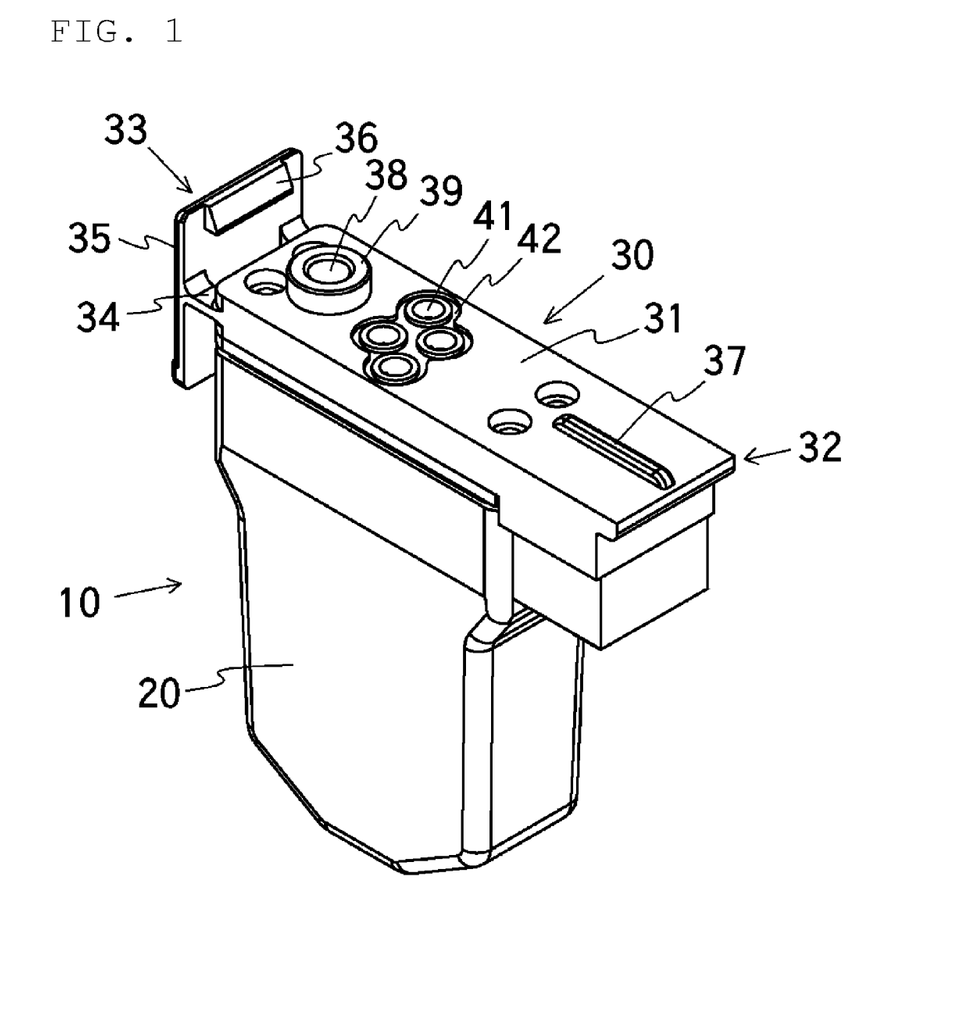
FIG. 1 is a perspective view of a valve.
Figure 2:
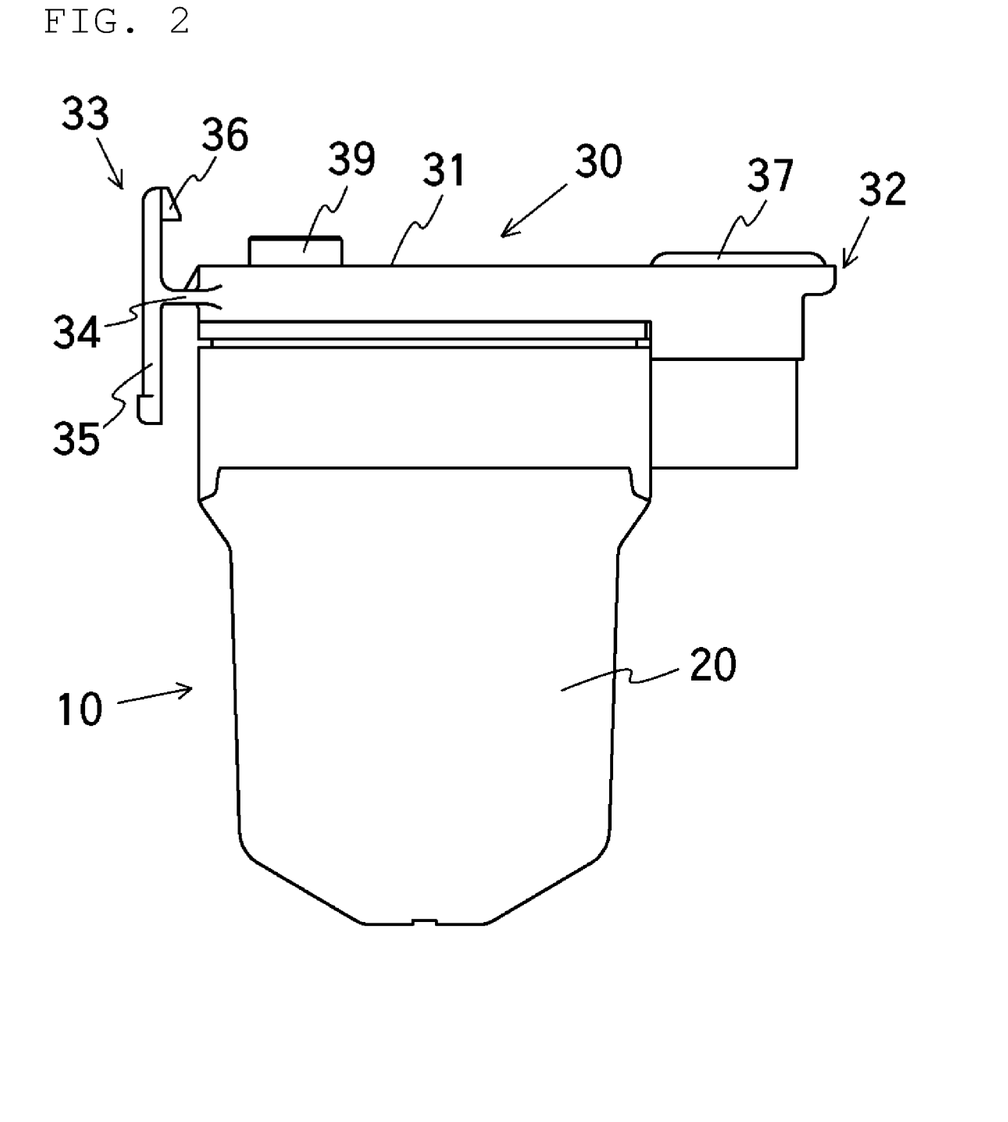
FIG. 2 is a front view of the valve.
Figure 3:
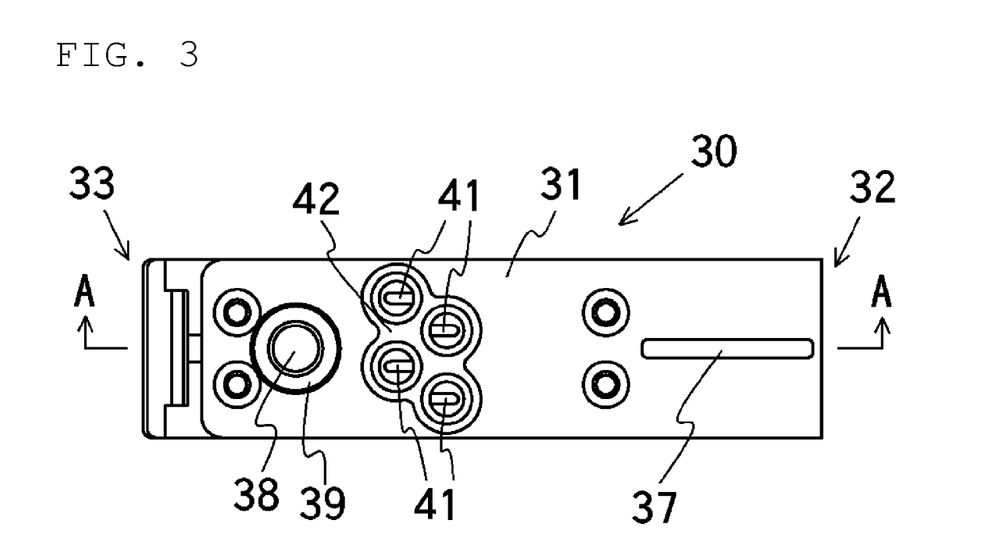
FIG. 3 is a plan view of the valve.

FIG. 1 is a perspective view of a valve. FIG. 2 is a front view of the valve. FIG. 3 is a plan view of the valve.

In an embodiment of the present invention, the valve 10 includes a gas suction path through which compressed air is sucked into a valve main body 20 and a gas discharge path through which the compressed air is discharged.

The valve 10 has a connector section 30 provided on the front surface of the valve main body 20.

The connector section 30 has a contact surface 31, which is located on the fluid apparatus attachment side of the valve 10, through which a suction port 38 of the gas suction path and discharge ports 41 of the gas discharge path open, and which comes into contact with a fluid apparatus.

A protruding section 32 is formed on one longitudinal side end of the connector section 30, and a hook section 33 is formed on the other longitudinal side end of the connector section 30.

The hook section 33 has an engaging section 36 formed on the front end of the hook section 33 and has a lever 35, the rear end side of which is a pressing section. The lever 35, specifically, a portion thereof in an intermediate position between the engaging section 36 and the pressing section is integrally linked with the other end of the connector section 30 via a hinge section 34 in an elastically deformable manner.

A protruding strip 37 is formed on one longitudinal side of the contact surface 31 and extends in the longitudinal direction of the contact surface 31.

A suction protruding section 39, through which the suction port 38 of the gas suction path opens, is formed on the other longitudinal side of the contact surface 31.

Further, the discharge ports 41 of the gas discharge path open through the portion between the protruding strip 37 and the suction protruding section 39, and gaskets 42 for preventing air from leaking through the portion between the fluid apparatus and the contact surface 31 are disposed in the portion. In the embodiment, four discharge ports 41 open by way of example.

The valve main body 20 is desirably made of a polyphenylene sulfide resin (PPS resin) containing glass fibers or any other resin material that excels in mechanical strength that allows the valve main body 20 to withstand the pressure of the air sucked therein.

The connector section 30 is desirably made of a polyacetal resin (POM resin) or any other resin material that has high modulus of elasticity and excels in fatigue resistance and wear resistance and formed in integral molding.

Figure 4:
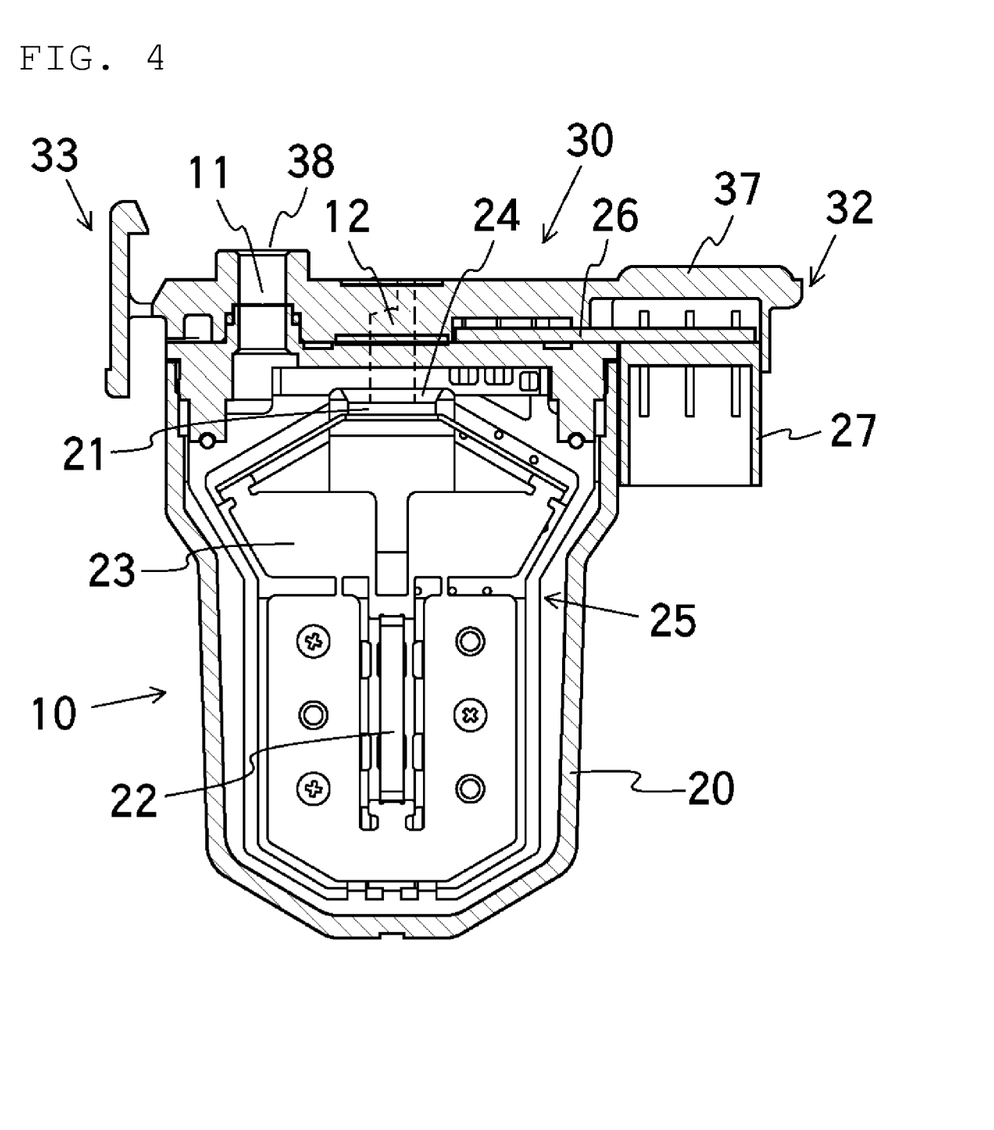
FIG. 4 is a cross-sectional view of the valve taken along the line A-A in FIG. 3.
Figure 5:
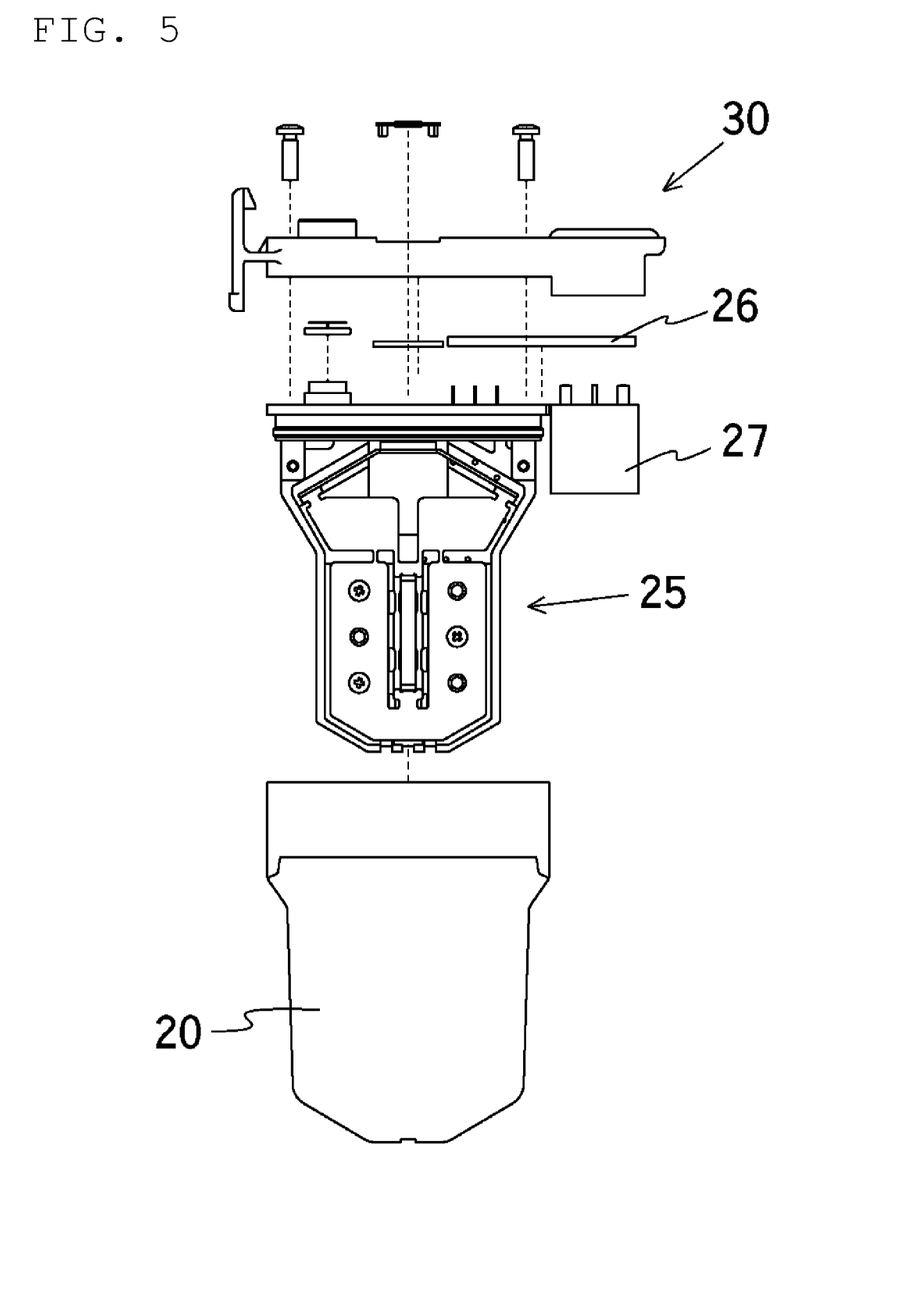
FIG. 5 is an exploded view of the valve.

FIG. 4 is a cross-sectional view of the valve taken along the line A-A in FIG. 3. FIG. 5 is an exploded view of the valve.

The valve 10 is a piezoelectric valve in which displacement of a piezoelectric element is used as drive force to actuate a valve body, and disposed in the valve main body 20 are a valve body 21, which opens and closes the gas discharge path 12, a piezoelectric element 22, which produces drive force in the form of displacement necessary to actuate the valve body 21, and an actuator 25, which has a displacement magnifying mechanism 23, which magnifies the displacement of the piezoelectric element 22 and applies the magnified displacement to the valve body 21.

The actuator 25 is so configured that when the piezoelectric element 22 is energized, the piezoelectric element 22 extends and separates the valve body 21 from a valve seat 24 with the aid of the displacement magnifying mechanism 23.

As a result, in the valve 10, the gas discharge path 12 is opened so that the compressed air sucked into the valve main body 20 is discharged through the discharge ports 41.

The actuator 25 is further so configured that when the energization of the piezoelectric element 22 is terminated, the piezoelectric element 22 contracts and causes the valve body 21 to rest on the valve seat 24 with the aid of the displacement magnifying mechanism 23.

As a result, in the valve 10, the gas discharge path 12 is closed so that the discharge of the compressed air is terminated.

In the embodiment, the valve 10 includes four gas discharge paths 12, and four sets of actuators 25 are disposed in the valve main body 20.

The valve 10 can therefore discharge the compressed air sucked into the valve main body 20 through the four discharge ports 41 shown in FIGS. 1 and 3 in an arbitrary manner by activating the four sets of actuators 25 in the corresponding manner.

In the present embodiment, in the valve 10, a wiring substrate 26 for feeding electricity to the piezoelectric element 22 is disposed between the valve main body 20 and the connector section 30, and a wiring connector 27 for feeding electricity to the piezoelectric element 22 via the wiring substrate 26 is disposed on the one side of the connector section 30 and in a position facing the side surface of the valve main body 20.

Figure 6:
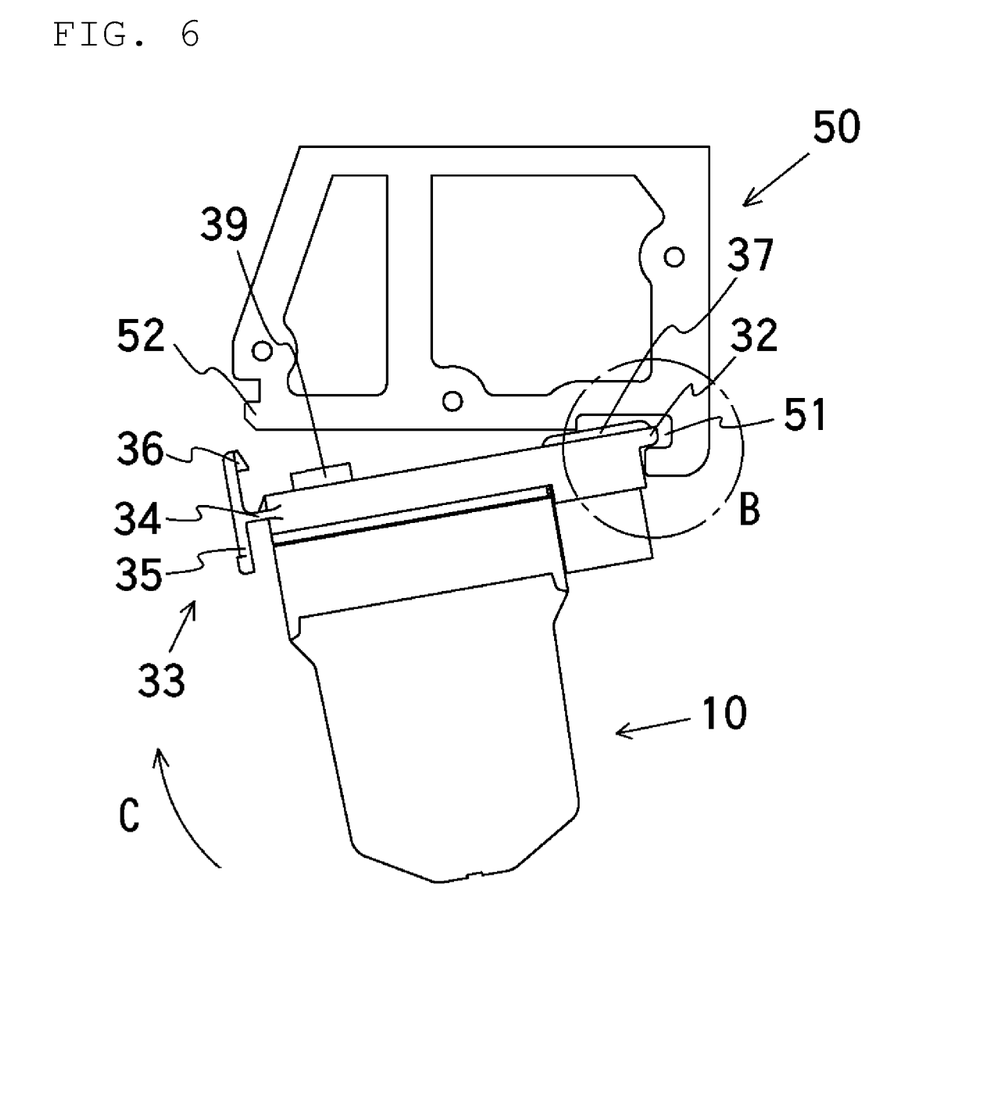
FIG. 6 describes operation of attaching the valve to a fluid apparatus.

FIG. 6 describes operation of attaching the valve to a fluid apparatus.

To attach the valve 10 to a fluid apparatus 50, the protruding section 32, which is formed at the one side end of the connector section 30, is first inserted into a recessed section 51, which is formed as part of a valve placement section of the fluid apparatus 50.

The valve 10 is then caused to pivot in the direction labeled with the arrow C with an inserted portion B, where the protruding section 32 has been inserted into the recessed section 51, serving as a supporting point. At this point, the hook section 33, which is formed on the other side end of the connector section 30, specifically, the engaging section 36, which is formed at the front end of the lever 35, comes into contact with an engaging protruding section 52, which is formed as part of the valve placement section of the fluid apparatus 50. An inclined surface is formed on each of an upper portion of the engaging section 36 and a lower portion of the engaging protruding section 52, so that the inclined surface of the engaging section 36 is guided along the inclined surface of the engaging protruding section 52, and the front end side of the lever 35 is bent rearward with the aid of the effect of the hinge section 34. The engaging section 36 at the front end of the lever 35 then travels over the engaging protruding section 52 of the valve placement section and engages with the engaging protruding section 52.

The valve 10 can thus be readily and quickly attached to the fluid apparatus 50 in one-touch operation.

Even in a case where no inclined surface is formed on the upper portion of the engaging section 36 or the lower portion of the engaging protruding section 52, pressing the pressing section on the rear end side of the lever 35 of the hook section 33 with a finger causes the front end side of the lever 35 to bend rearward with the aid of the effect of the hinge section 34, so that the engaging section 36 at the front end of the lever 35 is allowed to engage with the engaging protruding section 52 of the valve placement section.

Even in this case as well, the valve 10 can be readily and quickly attached to the fluid apparatus 50 in one-touch operation.

Further, to attach the valve 10 to the fluid apparatus 50, the protruding strip 37, which is formed on the one side of the connector section 30, is fit into a recessed strip that is not shown but is formed as part of the valve placement section of the fluid apparatus 50, and the suction protruding section 39, which is formed on the other side of the connector section 30, is fit into a gas supply recessed section which is not shown but is formed as part of the valve placement section of the fluid apparatus 50 and through which a gas supply passage opens.

The valve 10 can thus be readily, quickly, and precisely positioned with respect to the fluid apparatus 50.

Figure 7:
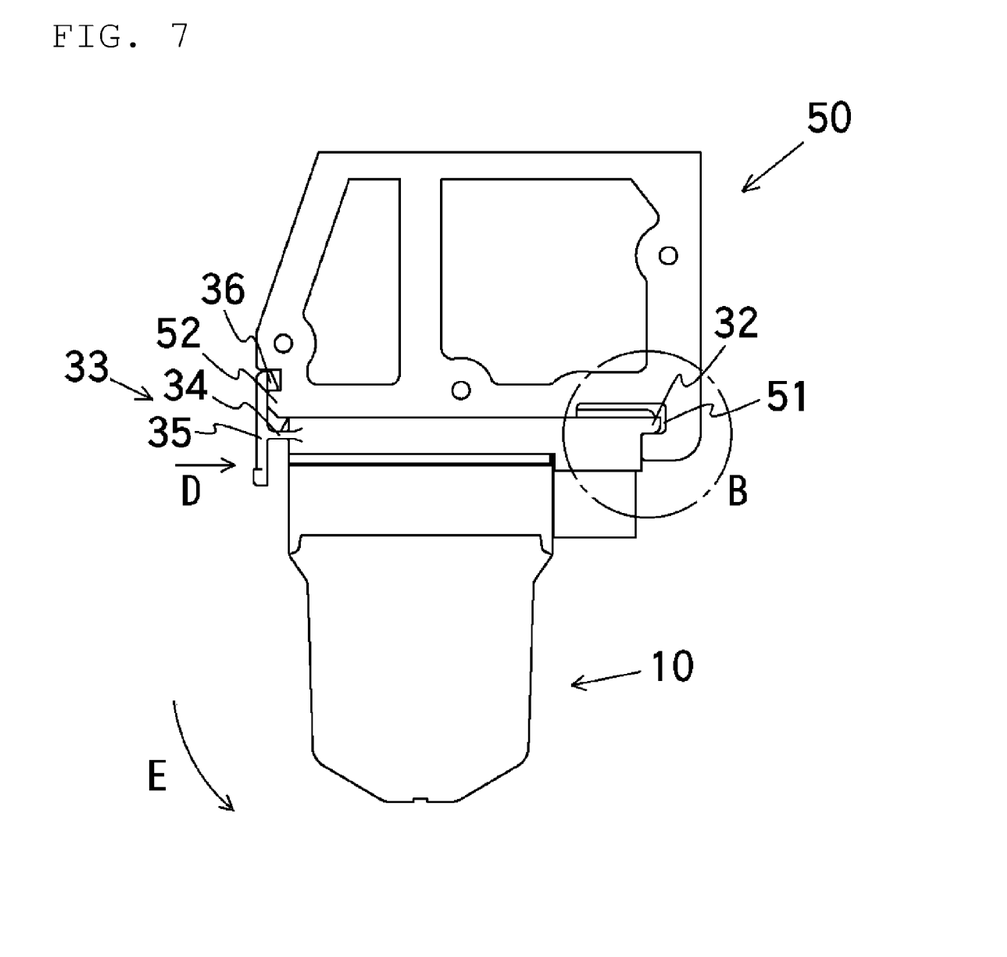
FIG. 7 describes operation of detaching the valve from the fluid apparatus.

FIG. 7 describes operation of detaching the valve from the fluid apparatus.

To detach the valve 10 from the fluid apparatus 50, the pressing section on the rear end side of the lever 35 of the hook section 33 is first pressed with a finger in the direction labeled with the arrow D to bend the front end side of the lever 35 rearward with the aid of the effect of the hinge section 34, so that the engaging section 36 at the front end of the lever 35 separates from the engaging protruding section 52, which is formed as part of the valve placement section of the fluid apparatus 50.

The valve 10 is then caused to pivot in the direction labeled with the arrow E with the inserted portion B, where the protruding section 32 formed on the one side end of the connector section 30 is inserted into the recessed section 51 formed as part of the valve placement section of the fluid apparatus 50, serving as the supporting point.

The valve 10 can thus be readily and quickly detached from the fluid apparatus 50 in one-touch operation.

Figure 8:
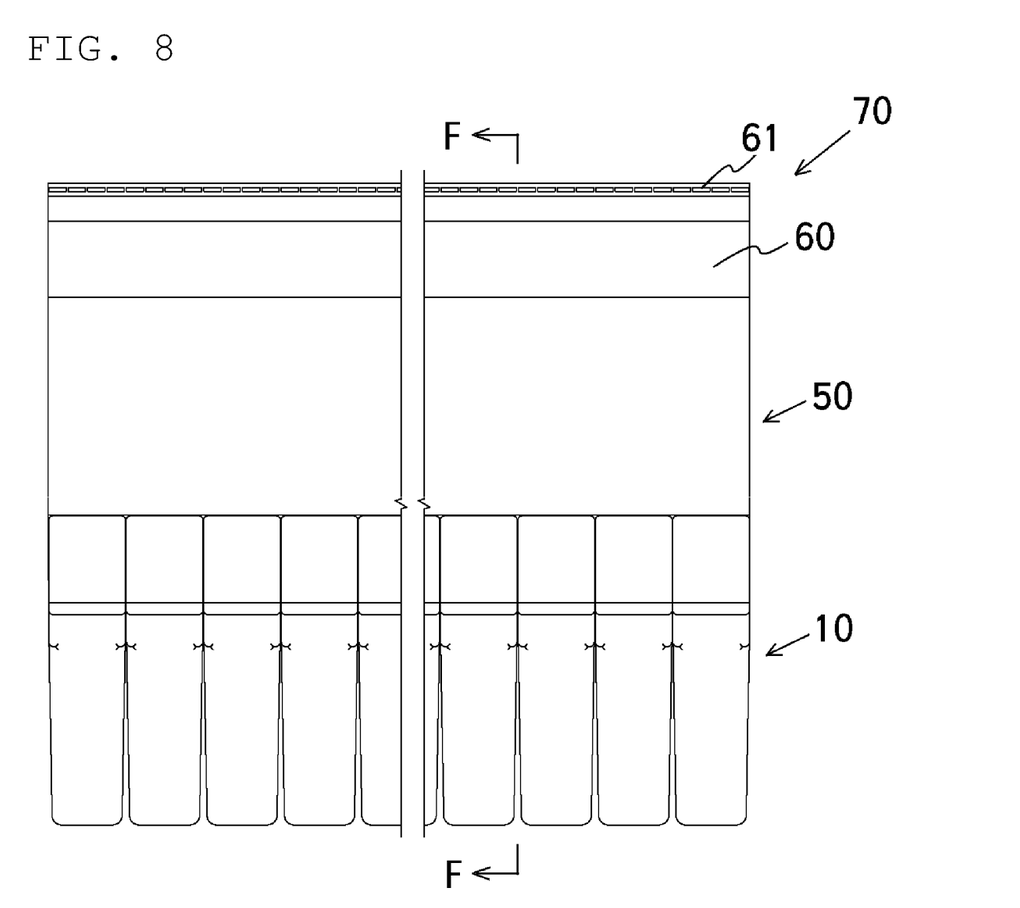
FIG. 8 describes an ejector.
Figure 9:
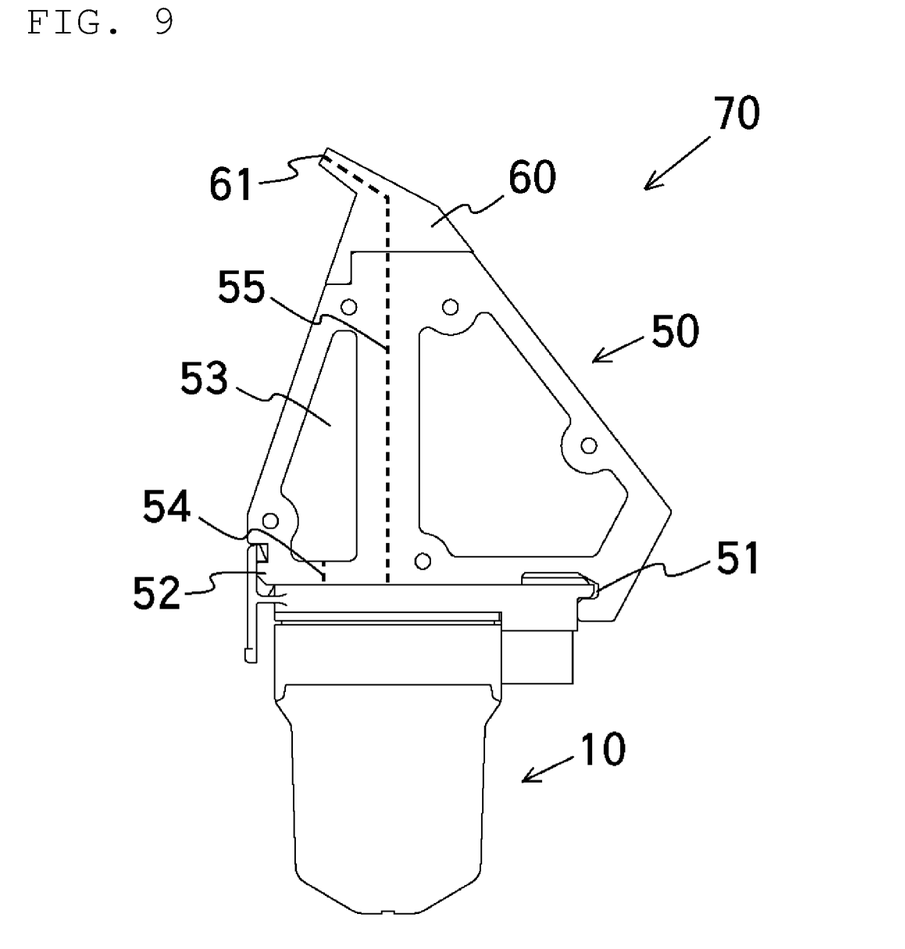
FIG. 9 is a cross-sectional view of the ejector taken along the line F-F in FIG. 8.

FIGS. 8 and 9 describe an ejector, and FIG. 9 is a cross-sectional view of the ejector taken along the line F-F in FIG. 8.

In the present embodiment, the fluid apparatus 50 is a manifold having an inner air space 53, to which compressed air is supplied from a compressed air source that is not shown, and the manifold 50 has a large number of gas supply passages 54, which communicate with the air space 53, and a large number of discharge passages 55, which communicate with nozzle holes 61 of a nozzle member 60, which will be described later.

A large number of valves 10, which have the gas section paths and the gas discharge paths that communicate with the gas supply passages 54 and the discharge passages 55, are connected to the manifold 50.

The ejector 70 is configured as follows: The nozzle member 60, which has a large number of nozzle holes 61, which communicate with the discharge passages 55 of the manifold 50, is attached to the manifold 50, to which the large number of valves 10 are connected.

The gas supply passages 54 and the discharge passages 55 are formed in the manifold 50 along the longitudinal direction thereof in such a way that one gas supply passage 54 and four discharge passages 55 form a constituent pair and the number of constituent pairs of the gas supply passage 54 and the discharge passages 55 is equal to the number of valves 10.

The recessed section 51 and the engaging protruding section 52 as shown in FIGS. 6 and 7 are so formed, as part of the valve placement section of the manifold 50, as to continuously extend along the longitudinal direction of the manifold 50.

Further, a pair of recessed strip and a gas supply recessed section that are not shown but are the same as those described with reference to FIGS. 6 and 7 are formed as part of the valve placement section of the manifold 50, and the number of pairs of the recessed strip and the gas supply recessed section is equal to the number of valves 10 connected to the manifold 50 along the longitudinal direction thereof.

The ejector 70 is so formed that when the valves 10 are attached to the manifold 50, the valve 10 are positioned with respect to the manifold 50 by use of the recessed strips and the gas supply recessed sections that are not shown but are formed along the longitudinal direction of the manifold 50 as in FIG. 6, and the valves 10 are attached to the manifold 50 by use of the recessed section 51 and the engaging protruding section 52 formed along the longitudinal direction of the manifold 50.

The large number of valves 10 can thus be quickly and precisely connected to the manifold 50.

The manifold 50 is desirably molded in aluminum extrusion because the manifold 50 requires strength, and the nozzle member 61 is desirably made of a resin and formed in integral molding because it has a complicated shape.

According to the present embodiment, the valve 10 can be attached to the fluid apparatus 50 by inserting the protruding section 32, which is formed on one longitudinal side end of the connector section 30, into the recessed section 51, which is formed as part of the valve placement section of the fluid apparatus 50, causing the valve 10 to pivot with the inserted portion B serving as a supporting point, and causing the engaging section 36, which is formed at the front end of the lever 35 of the hook section 33, which is formed on the other side end of the connector section 30, to engage with the engaging protruding section 52, which is formed as part of the valve placement section of the fluid apparatus 50.

Further, according to the present embodiment, the valve 10 can be detached from the fluid apparatus 50 by pressing the pressing section on the rear end side of the lever 35 of the hook section 33 with a finger to separate the engaging section 36 at the front end of the lever 35 from the engaging protruding section 52 of the valve placement section.

Therefore, according to the present embodiment described above, the valve 10 can be readily and quickly attached to and detached from the fluid apparatus 50, such as a manifold, in one-touch operation.

According to the present embodiment, when the fluid apparatus 50 is a manifold, since the recessed section 51 and the engaging protruding section 52 are so formed as part of the valve placement section of the manifold 50 as to continuously extend in the longitudinal direction of the manifold 50, a large number of valves 10 can be readily and quickly connected to the manifold 50.

Further, according to the present embodiment, when the fluid apparatus 50 is a manifold, since pairs of the recessed strip and the gas supply recessed section are formed as part of the valve placement section of the manifold 50 along the longitudinal direction of the manifold 50 and the number of pairs is equal to the number of valves, a large number of valves 10 can be readily, quickly, and precisely positioned with respect to the manifold 50.

According to the present embodiment, even when a piezoelectric valve is used as each of the valves 10, the wiring connector 27 for feeding electricity to the piezoelectric element 22 is disposed on one longitudinal side of the connector section 30 and in a position facing the side surface of the valve main body 20, each of the valves 10 can be compact in size, and the wiring connector 27 does not obstruct the attachment and detachment of the valves 10 to and from the fluid apparatus.

The valve attachment structure in the present embodiment is not necessarily associated with a piezoelectric valve. For example, even in the case of an electromagnetic valve, providing the electromagnetic valve with the connector section 30 allows the electromagnetic valve to be readily and quickly attached to and detached from the fluid apparatus 50 in one-touch operation.

The present invention is not limited to the embodiment described above, and the configuration according to the present embodiment can, of course, be changed as appropriate to the extent that the change does not depart from the scope of the present invention.

INDUSTRIAL APPLICABILITY

The present invention allows a valve to be readily and quickly attached to and detached from a fluid apparatus, such as a manifold, and is therefore highly practical.

REFERENCE SIGNS LIST

10 Valve (piezoelectric valve)
11 Gas suction path
12 Gas discharge path
20 Valve main body
21 Valve body
22 Piezoelectric element
23 Displacement magnifying mechanism
24 Valve seat
25 Actuator
26 Wiring substrate
27 Wiring connector
30 Connector section
31 Contact surface
32 Protruding section
33 Hook section
34 Hinge section
35 Lever
36 Engaging section
37 Protruding strip
38 Suction port
39 Suction protruding section
41 Discharge port
42 Gasket
50 Fluid apparatus (manifold)
51 Recessed section
52 Engaging protruding section
53 Air space
54 Air supply passage
55 Discharge passage
60 Nozzle member
61 Nozzle hole
70 Ejector

What is claimed is:

1. A valve attachment structure adapted to attach a valve to a fluid apparatus, the valve having a gas suction path that communicates with a gas supply passage of the fluid apparatus and a gas discharge path that communicates with a discharge path of the fluid apparatus, compressed air sucked via the gas supply passage of the fluid apparatus through the gas suction path of the valve into the valve being discharged by the valve in operation through the gas discharge path of the valve via the discharge passage of the fluid apparatus, the valve attachment structure characterized in that:

the valve is provided with a connector section having a contact surface which is located on a fluid apparatus attachment side of the valve that is a side to which the fluid apparatus is attached, through which a suction port of the gas suction path and a discharge port of the gas discharge path open, and which comes into contact with the fluid apparatus, the connector section has a protruding section formed on one side end thereof and a hook section formed on another side end thereof, the hook section has an engaging section formed on a front end thereof and has a lever having a rear end side that serves as a pressing section, the lever, specifically, a portion thereof in an intermediate position between the engaging section and the pressing section is linked with the other end of the connector section via a hinge section in an elastically deformable manner, and the protruding section formed at the one side end of the connector section is inserted into a recessed section formed as part of a valve placement section of the fluid apparatus, the valve is caused to pivot with an inserted portion that serves as a supporting point, and the engaging section formed at a front end of the lever of the hook section formed at the other side end of the connector section is allowed to engage with an engaging protruding section formed as part of the valve placement section of the fluid apparatus, so that the valve is attached to the fluid apparatus.

2. The valve attachment structure according to claim 1, wherein a protruding strip is formed on the contact surface of the connector section and on the one side of the connection section, the protruding strip extending from the one side toward the other side, a suction protruding section through which the suction port of the gas suction path opens being formed on the other side of the connector section, and the protruding strip formed on the one side of the connector section is fit into a recessed strip formed as part of the valve placement section of the fluid apparatus, and the suction protruding section formed on the other side of the connector section is fit into a gas supply recessed section which is formed as part of the valve placement section of the fluid apparatus and through which the gas supply passage opens, so that the valve is positioned with respect to the fluid apparatus.

3. The valve attachment structure according to claim 1, wherein the recessed section and the engaging protruding section are so formed, as part of the valve placement section of the fluid apparatus, as to continuously extend, and a plurality of valves are connected to the fluid apparatus by use of the recessed section and the engaging protruding section.

4. The valve attachment structure according to claim 1, wherein the valve includes a valve main body that sucks compressed air through the gas suction path, the valve is a piezoelectric valve in which a valve body that opens and closes the gas discharge path, a piezoelectric element that produces drive force in the form of displacement necessary to actuate the valve body, and an actuator having a displacement magnifying mechanism that magnifies the displacement of the piezoelectric element and applies the magnified displacement to the valve body are disposed in the valve main body, and a wiring substrate for feeding electricity to the piezoelectric element is disposed between the valve main body and the connector section, and a wiring connector for feeding electricity to the piezoelectric element via the wiring substrate is disposed on the one side of the connector section and in a position facing a side surface of the valve main body.

5. A fluid apparatus to which a valve is attached by the attachment structure according to claim 1.

6. An ejector of an optical particulate sorter, wherein the fluid apparatus according to claim 5 is a manifold to which a plurality of valves are connected, and the ejector is formed of the manifold.

* * * * *